Oct. 24, 1944.     C. M. GARNER     2,360,945
SOLENOID VALVE OPERATOR
Filed March 28, 1941

Patented Oct. 24, 1944

2,360,945

UNITED STATES PATENT OFFICE 2,360,945

SOLENOID VALVE OPERATOR

Claude M. Garner, University City, Mo., assignor to Automatic Control Corporation, St. Louis, Mo., a corporation of Delaware Application March 28, 1941, Serial No. 385,655

11 Claims. (Cl. 175—341)

The present invention relates to a solenoid valve; to a centering means for a shifting plunger; and especially to a centering means for the plunger of a solenoid valve.

The plunger of a solenoid valve requires a certain amount of play for free action. Solenoid valves are subject to two undesirable characteristics. One of them is a tendency to chatter or vibrate if the valve stem or plunger in its energized position gets off center, so that the magnetic path through the plunger is irregular. The other disadvantage is that there is a tendency for the valve to stick in its energized position.

The present invention proposes to overcome both of these disadvantages by simple mechanism that ensures centering of the plunger when energized, and does so in a flexible or resilient manner to accommodate for minor defects, and with the centering mechanism also offering a force accumulative with the normal return force for the plunger.

More specifically, this invention proposes resiliently to apply centripetal force to securely hold the plunger against lateral vibration; and resiliently to apply downward force to return the valve to its deenergized position.

In the drawing:

Fig. 1 is a horizontal section through the valve taken on the line 1—1 of Fig. 2;

Fig. 2 is a vertical central section taken on the line 2—2 of Fig. 1;

Fig. 3 is an elevation taken from the right side of Fig. 2;

Fig. 4 is an enlarged section of the upper portion of Fig. 2; and,

Fig. 5 is an enlarged section of one centering mechanism in released position.

The valve comprises a valve body member 10 having an inlet 11 and an outlet 12 separated by the usual partition 13. This partition 13 has in it a valve seat 14. The lower part of the body member 10 has mounted therein an adjustable screw 15 that may limit the downward or closing movement of the valve.

The upper part of the valve body member 10 has a circular and internally threaded portion 17 adapted to receive a closure and coil support member 18 of brass or like material, which is threaded into said threaded portion 17. This closure member 18 has a central opening therein into which is secured a tube 20 of nonmagnetic material such as a nonmagnetic stainless steel. About the top of the closure member 18 is disposed a disc 21 of magnetic material which is secured to the tube 20. At the top of the tube is secured a similar disc 22. Within the top of the tube 20 there is further secured a cap member 23 (Fig. 4) of magnetic material. This cap member 23 has a threaded projection 24 extending from the top thereof and about which a cover 25 of magnetic material is disposed, which cover 25 extends down to enclose the disc 21. A nut 26 secures the cover in position.

Insulation 27 in the proper number of parts to provide a spool shape is disposed about the tube 20, and on the inner faces of the discs 21 and 22. A coil 28 is wound around the spool-shaped insulation, with its outer surface insulated as by tape 29. Suitable leads 30 and 31 extend from the coil 28 through an internally threaded connector 32 mounted in the side of the cover member 25.

The cap member 23 within the tube 20 and as shown in Fig. 4 has an internal bore 35. This bore 35 tapers at 36 at its upper portion.

The tube 20 provides a guide for a valve stem generally indicated at 37, which comprises essentially a tubular element 38 of magnetic material such as stainless steel, in the top of which is secured an additional tubular shade collar 39 of nonmagnetic and low resistance material (such as copper); and this collar member 39 receives a headed plug 40 of magnetic material, the upper part 41 of the headed plug 40 being rounded so as to center automatically within the taper 36 of the cap 23.

To the lower end of the valve stem tube 38 there is threaded a flanged closure cap 43 that preferably is formed with flat surfaces so as to be removable with a wrench. This cap 43 is tubular and receives telescopically a stem element 45, the upper end of which is capped as at 46 within the tubular member 38. A light coil spring 47 surrounds the element 45 between the cap 46 and the upper part of the closure 43. The spring 47 absorbs any shock and noise occasioned by lifting of the element 38 prior to the actual opening of the valve.

The lower part of the element 45 is threaded to receive a valve hub 48 having secured thereto a valve head 49 that is adapted to close in the valve seat 14. A pin 50, or the like, is employed to prevent displacement of the hub 48 on the element 45. A leather washer 51 surrounds the element 45 and rests at the upper end of the hub 48 to absorb any shock and noise produced by contact with the bottom of the member 43.

The undersurface of the valve closure member 18 is hollowed out to provide a cylindrical space 55 of greater diameter than a communicating cylindrical opening 56, so that a ledge is provided at the bottom of the space 55. Within this space there is placed a three-cornered retainer member 58 formed of light spring material. This member 58 surrounds the lower end of the tube 20, and its main portion is disposed adjacent the top edge of the opening 56. It has three prongs 59, one turned down at each of its three corners, the lower parts of these prongs 59 having laterally extending spring arms 60 that resiliently engage against the side walls of the space 55 above the ledge and, in so doing, space the center part of the prongs 59 from that side wall in a resilient manner.

Immediately above the arm 60 each prong 59 is provided with an opening 61 therethrough. Through each opening 61 there is radially disposed a rigid leaf 62 that has an arcuate inner edge 63 substantially concentric with the tubular element 38. The outer end of each of these leaves 62 has a reduced prong 64 passing through the opening 61 and turned upwardly. It will be seen that these leaves 62 may pivot within the openings 61, each being retained on the one side by the shoulders formed by the reduction in size of the prong 64 and being limited in the other direction by the upstanding portion of the prong 64. The latter also limits the downward pivoting of the leaves. Furthermore, the resiliency of the arms 60 permits some radial movement of the leaves 62, as will be described.

Secured about the lower end of the tube 20 and below the three-cornered member 58 is a washer member 65 that is secured thereto to prevent withdrawal of both the tube 20 and the member 58. This washer member 65 has three leaf spring arms 66 extending at an angle downwardly therefrom to engage the several leaves 62 and urge them downwardly by contact therewith a short radial distance inwardly from the pivot opening 61.

The length of the leaves 62 is preferably slightly greater than the distance from the inner surface of the prongs 59 to the outer surface of the tubular element 38.

The operation of the device is as follows:

When the solenoid coil 28 is deenergized, the valve will be in its closed position, unless it is maintained open by the screw 15. In this position, the tubular element 38 is caused by gravity to lower until the member 43 rests upon the washer 51. Also, the leaves 62 are in their lower position, as shown in Fig. 5. In this position, their inner ends 63 are slightly spaced from the surface of the tubular element 38.

When the coil 28 is energized, magnetic flux is set up in a path including the two discs 21 and 22. This flux seeks the least reluctant path through the center of the coil. In part, this path includes the cap 23 at the top of the tube 20. It also includes the tubular element 38 of the valve stem 37. The collar 39 is nonmagnetic for shading purposes, but the headed plug 40 is of magnetic material.

The element 38 will, of course, then be drawn up into the coil 28 to reduce the reluctance of the path. When the rounded surface of the upper part 41 of the plug 40 engages the tapered portion 36 of the cap 23, the upper part of the valve will be centered so that any irregularities in the magnetic field as to centering will not cause vibration of this part of the valve.

The shade collar 39 prevents chattering of the stem 37 which would manifest itself as a hum. Due to the presence of the shade collar 39, a flux is caused to flow, due to the current induced therein, which is out of phase with the main flux. This induced flux holds the stem 37 stationary during the interval of time that the main flux is zero, obviating chatter.

In the ascent of the element 38, the closure 43 is also elevated. As it approaches its upper limit, its flange engages the inner ends 63 of the radially extending leaves 62 and causes these inner ends 63 to be elevated with it. By this action, the leaves 62 pivot about the openings 61 or, more particularly, about the engagement of the shoulders with the inner surfaces of the prongs 59. Owing to the fact that the effective length of the leaves 62 is slightly greater than the radial distance from the inner surface of the prongs to the surface of the element 38 when the valve is in its upper position, these leaves 62 will be displaced radially outwardly against the spring within the prongs 59 and the spring arms 60. There are at least three of these radial arms so that they produce a force acting to hold the valve stem 37 securely and to prevent the lower part thereof from vibrating because of any inequalities in the magnetic field.

In this upward action of the leaves 62, the spring arms 66 are displaced somewhat from their normal position so that they exert a light force downwardly on the leaves. Hence, when the valve is released, the leaves 62 will again be forced to their lower positions and will not be permitted to stick in their upper positions. This force likewise is transmitted to the valve stem 37 and adds to the force of gravity, causing the valve to close and assisting in preventing sticking of the valve in its upper position.

The members 58 and 65 are preferably made of light spring material, since the forces required by them are ordinarily small; 62 is a rigid member.

It will be seen that a valve has been provided which centers both the upper and the lower parts of the valve stem to prevent chattering and vibration of the valve stem when the coil is energized. This is accomplished by a very simple and inexpensive means that is nevertheless most effective.

What I claim is:

1. In a mechanism of the kind described, a solenoid mechanism including a housing, a stem adapted to reciprocate in the housing, means to center the stem comprising a plurality of individual leaves projecting from the housing toward the stem, and being of a length to extend to the stem when it is in one position and centered, said leaves being pivotally mounted to oscillate in a direction parallel to the stem, whereby when the stem is out of said one position the leaves may oscillate away therefrom, means on the stem to engage said leaves upon movement toward said position and to oscillate the leaves into position to center the stem, and means urging the leaves away from centering position.

2. In a mechanism of the kind described, a housing, a stem reciprocable in the housing and adapted to be centered therein, a plurality of leaves disposed substantially radially of the stem, said leaves having base ends and projecting ends extending toward the stem, means pivotally supporting the base ends of the leaves in the housing, means yieldably maintaining the leaves with their projecting ends extending radially toward the stem, but adapted resiliently to permit radial displacement from the stem, said leaves having their projecting ends disposed so as to be capable of extending inwardly slightly beyond the surface of the stem and adapted to pivot away from the stem when it moves away from centering position, and means on the stem to engage the leaves and to move the leaves with the stem to centering position, the excess length of the leaves being absorbed by the yieldable means.

3. In a mechanism of the kind described, a cylindrically wound energizable coil having an axial opening, a stem adapted to be displaced along said axis upon energization of the coil, from a first position to a second, means adapted to be engaged at one end of the stem upon its movement to second position, and resilient means engageable with a separate portion of the stem in its second position, said resilient means, comprising a leaf having a base end and a projecting end, means supporting the base end on the housing for angular movement of the leaf, said leaf being of a length to extend to the stem and have a centering relation therewith when the leaf is substantially perpendicular to the stem axis, but of insufficient length to have such relation when pivoted to an acute angle to said axis, means on the stem to engage said projecting end of the leaf as the stem moves from first toward second position, to displace the leaf to centering relationship when the stem reaches second position, and means providing a backing force on the stem for said centering force of the leaf.

4. In a mechanism of the kind described, a housing, a stem reciprocable therein from first to second positions in a given path, centering means therefor including a plurality of L-shaped leaves, one leg of each being extended laterally to provide a shoulder at the bend between the legs, spring means having a slot to receive the other leg as far as the shoulder, and to yieldably maintain the other leg generally radially outwardly, said leg being adapted to pivot in a plane parallel to the stem axis, about said shoulder, spring means to urge each leaf in one direction out of a plane perpendicular to the stem axis, and means on the stem to engage the leaves and move them to centering position wherein they are substantially perpendicular to the stem axis, as the stem moves from first to second position.

5. In a mechanism of the kind described, a housing, a coil, a magnetic core movable therein, stop means between one end of the core and the coil, said stop means including a tapered centering socket member and a plug member, one of which members is on the coil and the other on the core, and both of which are magnetic, means breaking the magnetic path between the member on the core and the core itself, said socket member and plug member acting to center and limit inward movement of the core, a flange at the other end of the core, radially extending means on the housing adapted to be engaged by the flange on the inward movement of the core, and pivoted toward a position perpendicular to the axis of the core, to center said other end of the core, said radially extending means having inner ends capable of extending radially inward beyond the surface of the core, but also being resiliently yieldable radially outward, whereby said radially extending means may effect substantial centering of the outer end of the core despite variations in inward movement of the core as limited by said centering socket member and plug member.

6. In a mechanism of the kind described, a housing, a stem reciprocable therein from a first to a second position, a centering device for the stem including a plurality of elements extending radially of the stem to have their inner ends disposed adjacent the stem, means mounting the elements for movement of their inner, stem ends from position out of centering engagement with the stem to such centering engagement, and means movable upon movement of the stem for causing the stem ends of the elements to move to such centering engagement when the stem moves from first to second position, said elements being radially yieldable outwardly so as not to bind the stem against free axial movement.

7. In a mechanism of the kind described, a housing, a stem reciprocable therein from a first to a second position, a centering device for the stem including a plurality of elements extending radially of the stem to have their inner ends disposed adjacent the stem, means mounting the elements for movement of their inner, stem ends from position out of centering engagement with the stem to such centering engagement, said mounting means comprising resilient supporting means for the elements to enable them yieldably to move radially outward from the stem, and means movable upon movement of the stem for causing the stem ends of the elements to move to such centering engagement when the stem moves from first to second position.

8. In a mechanism of the kind described, a housing, a stem reciprocable in said housing from a first to a second position, a leaf having a base end and a projecting end, means mounting the base end of the leaf onto the housing so that the projecting end extends toward the stem, said mounting means being adapted to support said projecting end for arcuate movement from a first position at an acute angle to the axis of the stem toward a position at a right angle to the said axis of the stem, said leaf being of a length to engage the stem in a centering relationship when the leaf is in substantially said right angular position, but being of insufficient length to engage the stem in said manner when in its first position, additional means engageable with the stem to afford a backing force for said centering action, means on the stem to engage the projecting end of the leaf when the stem moves from first toward second position, and to move the same to centering position when the stem attains its second position.

9. In a mechanism of the kind described, a housing, a stem reciprocable in said housing from a first to a second position, a leaf having a base end and a projecting end, means mounting the base end of the leaf onto the housing so that the projecting end extends toward the stem, said mounting means being adapted to support said projecting end for arcuate movement from a first position at an acute angle to the axis of the stem toward a position at a right angle to the said axis of the stem, said leaf being of a length to engage the stem in a centering relationship when the leaf is in substantially said right angular position, but being of insufficient length to engage the stem in said manner when in its first position, additional means engageable with the stem to afford a backing force for said centering action, means on the stem to engage the projecting end of the leaf when the stem moves from first toward second position, and to move the same to centering position when the stem attains its second position, and resilient means urging the leaf to non-centering position.

10. In a mechanism of the kind described, a housing, a stem reciprocable in said housing from a first to a second position, a leaf having a base end and a projecting end, means mounting the base end of the leaf onto the housing so that the projecting end extends toward the stem, said mounting means being adapted to support said projecting end for arcuate movement from a first position at an acute angle to the axis of the stem toward a position at a right angle to the said axis of the stem, said leaf being of a length to engage the stem in a centering relationship when the leaf is in substantially said right angular position, but being of insufficient length to engage the stem in said manner when in its first position, additional means engageable with the stem to afford a backing force for said centering action, means on the stem to engage the projecting end of the leaf when the stem moves from first toward second position, and to move the same to centering position when the stem attains its second position, and resilient means urging the leaf to non-centering position, said mounting means comprising means supporting the leaf for resilient displacement away from the stem.

11. In a mechanism of the kind described, a coil having a core opening therein, a stop member across the core opening, said member being of magnetic material, a core member operable in the core opening and having a portion of magnetic material, a plug on one of said members engageable with the other, a non-magnetic shading ring supporting the plug on its member but providing an air gap therebetween, said plug extending through the ring to adjacent the member on which it is supported, but magnetically spaced therefrom.

CLAUDE M. GARNER.